US009538457B2

(12) United States Patent
Syed et al.

(10) Patent No.: US 9,538,457 B2
(45) Date of Patent: Jan. 3, 2017

(54) WIRELESS SPECTRUM USAGE AND CONTROL OF ACCESS POINT PROBE RESPONSES

(71) Applicants: Hussain Zaheer Syed, Ashburn, VA (US); Muhib Taiye Oduwaiye, Germantown, MD (US); Sunmeel Meelind Bhumkar, Rockville, MD (US)

(72) Inventors: Hussain Zaheer Syed, Ashburn, VA (US); Muhib Taiye Oduwaiye, Germantown, MD (US); Sunmeel Meelind Bhumkar, Rockville, MD (US)

(73) Assignee: Time Warner Cable Enterprises LLC, New York, NY (US)

( * ) Notice: Subject to any disclaimer, the term of this patent is extended or adjusted under 35 U.S.C. 154(b) by 32 days.

(21) Appl. No.: 14/330,470

(22) Filed: Jul. 14, 2014

(65) Prior Publication Data

US 2016/0014678 A1 Jan. 14, 2016

(51) Int. Cl.
*H04W 48/16* (2009.01)
*H04W 48/20* (2009.01)
*H04W 84/12* (2009.01)

(52) U.S. Cl.
CPC .......... *H04W 48/16* (2013.01); *H04W 48/20* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2002/0080759 A1* | 6/2002 | Harrington | ........... | G01S 5/0215 370/338 |
| 2005/0195109 A1* | 9/2005 | Davi | ............... | G01S 5/0226 342/463 |
| 2008/0316982 A1* | 12/2008 | Murty | .............. | H04W 48/02 370/338 |
| 2008/0320108 A1* | 12/2008 | Murty | .............. | H04W 48/20 709/220 |
| 2009/0147697 A1* | 6/2009 | Malik | .............. | H04W 48/08 370/254 |
| 2013/0182611 A1* | 7/2013 | Kneckt | ............. | H04W 8/005 370/255 |

(Continued)

*Primary Examiner* — Robert C Scheibel
(74) *Attorney, Agent, or Firm* — Chapin IP Law, LLC

(57) ABSTRACT

A mobile communication device generates a respective discovery request (probe request) in a wireless network. The mobile communication device generates the probe request to learn of available access points providing access to a network such as the Internet. Any access points within range of the mobile communication device receive the discovery request generated by the mobile communication device. In lieu of each of the access points immediately generating a respective probe response to the mobile communication device, each of the access points receiving the discovery request provides notification of the receipt of the discovery request to a wireless network controller controlling communications in the wireless network. The wireless network controller controls which of the multiple access points in the network responds to the discovery request, reducing a number of probe responses collectively generated by the wireless access points to the mobile communication device.

30 Claims, 8 Drawing Sheets

(56) References Cited

U.S. PATENT DOCUMENTS

2013/0322418 A1* 12/2013 Ho ........................ H04W 48/20
 370/338
2014/0211691 A1* 7/2014 Emadzadeh .......... H04W 64/00
 370/328
2015/0257117 A1* 9/2015 Diener .................. H04W 48/14
 370/328

* cited by examiner

WIRELESS SPECTRUM USAGE AND CONTROL OF ACCESS POINT PROBE RESPONSES

BACKGROUND

Conventional RF (Radio Frequency) technology has been used for many years to connect wireless devices such as phones, laptops, etc., to landline networks and/or other wireless networks. Today, RF technology supports many different types of connection services such as cellular voice and data communications, high-speed data services, etc.

One type of RF technology is known as Wi-Fi™. This more recently implemented short-range wireless technology includes large-scale installation of WiFi™ base stations (access points). In comparison to the conventional long-range cellular network technology, WiFi™ technology supports short-range communications such as 200-300 meters as opposed to 1500 or more meters provided by cellular telephone base stations. In comparison to installation of each cellular telephone tower, installation of a respective WiFi™ base station is substantially less expensive.

Wi-Fi™ technology is defined by specifications from the Institute of Electrical and Electronics Engineers (IEEE) 802.11 standards. In general, Wi-Fi™ technology enables computerized devices such as laptop computers, mobile phones, tablet computers, etc., to wirelessly connect to a corresponding computer network. Via a respective wireless link, computer devices can retrieve data over a network such as the Internet.

Conventional computer devices typically have the ability to identify a presence of WiFi™ access points in a corresponding network environment. For example, according to current Wi-Fi™ technology, and a passive scanning technique, each of the access points in a network environment transmits a beacon signal indicating its presence. The mobile computer devices monitor the region for beacons (i.e., wireless signals as generated by the access points) to determine which, if any, access points are present in the region. The mobile computer device selects a suitable access point amongst the multiple access points to establish a WiFi™ connection.

WiFi™ technology also can support an active scanning technique. In accordance with the active scanning technique, to learn of one or more access points in a region, a computer device can broadcast a wireless probe request signal in the network environment. In response to receiving the wireless probe request signal, any of one or more active WiFi™ network access points within range of the computer device will respond with information indicating their identities. The querying computer device receives and processes the responses. Via the response information from the access points, the operator of the computer can identify which, if any, WiFi™ access points are present in the region.

In certain instances, after identifying one or more publicly available WiFi™ networks, the computer device can be configured to initiate display of the identities of the different WiFi™ networks on a display screen for viewing by a respective user of the computer device. If desired, the user of the computer can manually select from a listing of the available WiFi™ networks in which to connect. Alternatively, the computer can be configured to automatically select an available WiFi access point from the listing.

BRIEF DESCRIPTION OF EMBODIMENTS

Conventional techniques of discovering presence of wireless access points in a network environment suffer from deficiencies. For example, as previously discussed, a respective mobile communication device can transmit a probe request in a geographical region to learn of a presence of any available access points in a particular geographical region. Any access points within range of the mobile communication device will respond to the probe request with a respective probe response. In certain instances, some mobile computer devices constantly send out probe requests, even though they do not wirelessly connect to any access points. This conventional technique of needlessly transmitting probe requests can significantly reduce the overall throughput capacity of a wireless network system because a substantial portion of the wireless spectrum is used to support needless probe request and corresponding probe responses. Needless transmission of communications in CSMA/CA (Carrier Sense Multiple Access/Collision Avoidance) type of network can have a substantial impact on data throughput because a transmitter uses feedback from a receiver to determine whether another transmission is in progress before initiating a transmission. Thus, probe request probe responses can prevent wireless communications.

Embodiments herein deviate with respect to conventional techniques. For example, embodiments herein include novel ways of managing access point discovery requests and corresponding access point responses in a respective network environment to more efficiently use an available wireless spectrum.

More specifically, in accordance with one embodiment, a wireless network includes a number of access points providing access to a respective network such as the Internet. Assume that a mobile communication device generates a respective discovery request (probe request) in the wireless network. The mobile communication device generates the discovery request to learn of access points available to provide the mobile communication device access to the network.

Any of one or more access points within range of the mobile communication device receives the discovery request generated by the mobile communication device. According to embodiments herein, in lieu of immediately generating a probe response to the mobile communication device, each of the access points receiving the discovery request provides notification of the receipt of the discovery request to a wireless network controller controlling communications in the wireless network.

In one embodiment, in contrast to conventional techniques, the wireless network controller controls which of the multiple access points in the network responds to the discovery request generated by the mobile communication device. For example, assume that the controller receives a notification indicating generation of the discovery request in the wireless network. The notification indicating generation of the discovery request can be received in any suitable manner. For example, in one embodiment, the notification to the controller can include an individual message from each of the respective access points in the group of access points that receives the discovery request. More specifically, a first access point can notify the controller that the first access point receives the discovery request from the mobile communication device; a second access point can notify the controller that the second access point receives the discovery request from the mobile communication device; and so on. Accordingly, the collective messages received from the different access points indicate which of the access points in the wireless network received the discovery request.

In accordance with further embodiments, the controller selects fewer-than-all access points from the group (of all access points receiving the discovery request) to respond (with a discovery response) to the wireless discovery request generated by the mobile communication device.

For example, in one embodiment, the controller then forwards feedback to the fewer-than-all access points in the group. In one embodiment, the feedback notifies the selected (i.e., fewer-than-all) access points in the group whether to respond to the discovery request with a discovery response. Via the feedback, each of the fewer-than-all access points in the group receives the authorization to respond to the discovery request. In response to receiving the feedback, authorized access points notify the mobile communication device of their presence and availability to wirelessly access the network.

As a specific example, a group of four access points in the respective wireless network may receive the discovery request generated by the mobile communication device. Via communications generated by the four access points, the controller receives notification that each of the four access points receives the discovery request generated by the mobile communication device. To reduce use of a portion of an available wireless spectrum to support probe responses (discovery responses), the controller selects fewer than all four access points to respond to the discovery request. As an example, the controller may select two best-suited access points (fewer-than-all access points that receive the discovery request) to respond to the discovery request.

As further discussed herein, any suitable method can be used to determine the best-suited access points to respond.

Embodiments herein are useful over conventional techniques. For example, reducing the number of wireless communication probe responses transmitted in a wireless network frees up the wireless spectrum for transmission of data by other devices.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device (e.g., computer processing hardware) having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiments herein include a computer readable storage medium and/or system having instructions stored thereon. The instructions, when executed by computer processor hardware, cause the computer processor hardware to: receive a notification indicating generation of a discovery request by a mobile communication device to learn of access points available to the mobile communication device in the network, the notification indicating a group of access points that received the discovery request; select fewer-than-all access points from the group to respond to the wireless discovery request; and forward feedback to the fewer-than-all access points in the group, the feedback notifying the selected fewer-than-all access points in the group to respond to the discovery request with a discovery response.

One or more embodiments herein include a computer readable storage medium and/or system having instructions stored thereon. The instructions, when executed by computer processor hardware, cause the computer processor hardware to: at a first access point amongst multiple access points in a network, receive a discovery request generated by a mobile communication device; from the first access point, provide notification of the receipt of the discovery request to a controller, the controller controlling which of the multiple access points in the network responds to the discovery request generated by the mobile communication device; and at the first access point, receive feedback from the controller, the feedback specifying control of the first access point's response to the received discovery request.

The ordering of the operations above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for controlling wireless communications in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts optionally can be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
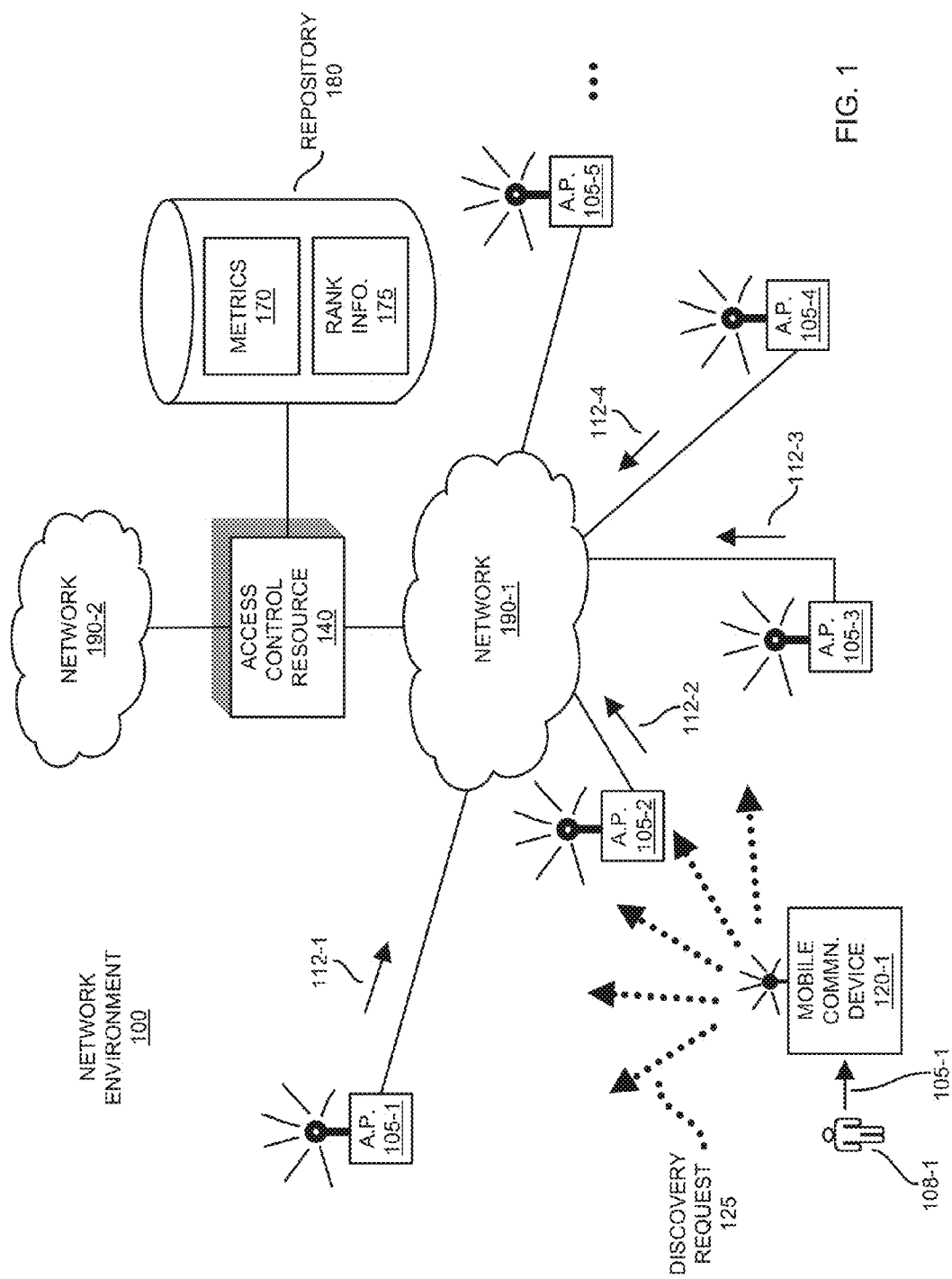
FIG. 1 is an example diagram illustrating transmission of a discovery request and reception of the discovery request by multiple access points in a network environment according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

In accordance with one embodiment, a mobile communication device generates a respective discovery request (probe request) in a wireless network. The mobile communication device generates the probe request to learn of available access points providing wireless access to a network such as the Internet. Any access points within range of the mobile communication device receive the discovery request generated by the mobile communication device. In lieu of each of the access points immediately and unconditionally generating a respective probe response to the mobile communication device, each of the access points receiving the discovery request provides notification of the receipt of the discovery request to a wireless network controller controlling communications in the wireless network. The wireless network controller controls which of the multiple access points in the network responds to the discovery request, reducing a number of probe responses collectively generated by the wireless access points to the mobile communication device.

Now, more specifically, FIG. 1 is an example diagram illustrating a network environment and corresponding resources supporting selective response to discovery requests according to embodiments herein.

As shown, network environment 100 includes mobile communication device 120-1. Mobile communication device 120-1 can be one of multiple mobile communication devices operating in network environment 100.

In this example embodiment, user 108-1 provides input 105-1 to operate mobile communication device 120-1. Via input 105-1, and assuming that the access control resource 140 grants the user 108-1 access to network 190-2, the user 108-1 can perform different operations such as establish a wireless communication link with a respective access point and communicate through the access point over network 190-2 (such as the Internet) with one or more servers.

Each of the mobile communication devices 120 can be any suitable type of computer device. For example, a respective mobile communication device in network environment 100 can be a cell phone, mobile computer, mobile phone device, digital assistant, a laptop computer, a personal computer, a notebook computer, a netbook computer, a handheld computer, a workstation, etc.

Each mobile communication device is equipped to communicate in a wireless manner with an available access point. In one non-limiting example embodiment, each of the access points 105 supports WiFi™ communications.

In accordance with further embodiments, note that networks 190 (network 190-1 and network 190-2) can be or include any suitable type of wired or wireless network resources facilitating communications. In one embodiment, the networks 190 support client/server communications and delivery of data packets using network addresses assigned to each of the resources.

As further shown, network environment 100 includes access control resource 140. As its name suggests, the access control resource 140 controls wireless connectivity of respective mobile communication device 120-1 with access points 105. In certain instances, the user 108-1 must be a respective subscriber to use any of the access points 105.

Embodiments herein deviate with respect to conventional techniques. For example, embodiments herein include novel ways of managing access point discovery requests and corresponding access point responses in a respective network environment 100 to more efficiently use an available RF (Radio Frequency) spectrum.

More specifically, as shown, in accordance with one embodiment, network environment 100 includes a number of access points 105 (access point 105-1, access point 105-2, access point 105-3, access point 105-4, access point 105-5, . . . ) that potentially provide the mobile communication device 120-1 (and other mobile communication devices in network environment 100) access to respective network 190-2.

In this example embodiment, assume that the mobile communication device 120-1 generates a respective discovery request 125 (such as a wireless broadcast message or WiFi™ probe request) in network environment 100. In one embodiment, the discovery request 125 generated by the mobile communication device is a wireless signal transmitted in a vicinity of the group of access points including access point 105-1, 105-2, 105-3, and 105-4.

The mobile communication device 120-1 generates the discovery request 125 to learn of any access points 105 available to provide the mobile communication device 120-1 access to the network 190-2. Any of the access points 105 within wireless communication range of the mobile communication device 120-1 receives the discovery request generated by the mobile communication device 120-1.

Assume in this example embodiment that access point 105-1, access point 105-2, access point 105-3, and access point 105-4, each receive the discovery request 125 generated by the mobile communication device 120-1. In lieu of each access point immediately generating and transmitting a wireless probe response to the mobile communication device 120-1, each of the access points receiving the discovery request 125 provides notification of the receipt of the discovery request 125 to access control resource 140. As mentioned, access control resource 140 controls access in the network environment 100.

The access control resource 140 (wireless network controller) controls which of the multiple access points in the network responds to the detected discovery request 125 generated by the mobile communication device 120-1. For example, the access control resource 140 receives a notification indicating detection of the discovery request 125 in the network environment 100.

The notification indicating generation or detection of the discovery request 125 can be received by the access control resource 140 in any suitable manner. For example, in one embodiment, the notification to the access control resource 140 can include an individual message from each of the respective access points in the group of access points that receives the discovery request 125. For example, in one non-limiting example embodiment, via communication 112-1 to the access control resource 140, the first access point 105-1 notifies the access control resource 140 that the first access point 105-1 receives the discovery request 125 from the mobile communication device 120-1; via communication 112-2 to the access control resource 140, the second access point 105-2 notifies the access control resource 140 that the second access point 105-2 receives the discovery request 125 from the mobile communication device 120-1; via communication 112-3 to the access control resource 140, the third access point 105-3 notifies the access control resource 140 that the third access point 105-3 receives the discovery request 125 from the mobile communication device 120-1; via communication 112-4 to the access control resource 140, the fourth access point 105-4 notifies the access control resource 140 that the fourth access point 105-4 receives the discovery request 125 from the mobile communication device 120-1; and so on.

Accordingly, the collective set of messages 112 received from the group of access points including access point 105-1, access point 105-2, access point 105-3, and access point 105-4 indicate which of the access points in the wireless network received the discovery request 125.

By further way of non-limiting example embodiment, note that each of the respective access points 105 receiving the discovery request 125 can be configured to generate and transmit metrics to the access control resource 140. The transmitted metrics can include any suitable data such as detected attributes of the discovery request 125 received by the access points, attributes of the access point, etc.

More specifically, in one embodiment, the access point 105-1 can be configured to monitor and detect a received signal strength metric (such as RSSI or received signal strength indicator) associated with receipt of the discovery request 125 by the access point 105-1. Via communications 112-1 from access point 105-1 to access control resource 140, the access point 105-1 notifies the access control resource 140 of the received signal strength metric associated with the discovery request 125. The strength of receiving the discovery request 125 can be used for any suitable purpose such as to determine a degree of nearness of the mobile communication device 120-1 to access point 105-1, ability of the access point 105-1 to received communications from the mobile communication device 120-1, etc.

In accordance with further embodiments, the access point 105-1 can be configured to monitor and detect a signal-to-noise ratio metric (such as SNR) associated with receipt of the discovery request 125 by the access point 105-1. Via communications 112-1 to access control resource 140, the access point 105-1 notifies the access control resource 140 of the measured signal-to-noise metric associated with received discovery request 125.

In accordance with further embodiments, the access point 105-1 can be configured to monitor and detect an angle associated with receipt of the discovery request 125 received by the access point 105-1. The angle indicates a direction from which the respective access point 105-1 detects presence of the mobile communication device 120-1. Via communications 112-1 from access point 105-1 to access control resource 140, the access point 105-1 notifies the access control resource 140 of the direction in which access point 105-1 receives the discovery request 125 in network environment 100.

Note that in one embodiment, the access control resource 140 (such as using a matrix) keeps track of the different locations of access points 105 in network environment 100. The locations of the access points can be detected in any suitable manner such as: by knowing the exact location where each access point is installed, based on an analysis of communications amongst the different access points indicating relative locations of the access points with respect to each other, feedback from the different access points, etc. As previously discussed, received location information may only provide a clue as to the location of a respective mobile communication device in the network environment 100. Embodiments herein can include utilizing received location information in conjunction with the previously learned whereabouts of the different access points in the network environment 100 to more precisely determine the location of the respective mobile communication device 120-1. For example, the angle of arrival information (as well as other communication metrics) can be applied to the previously learned locations of the access points 105 to aid the access control resource 140 in determining a more exact location of the mobile communication device 120-1 in network environment 100.

More specifically, in accordance with one embodiment, assume that the first access point 105-1 transmits metrics such as angle of received information to the access control resource 140. By way of non-limiting example embodiment, the attributes of the discovery request can indicate a relative location of the mobile communication device 120-1 in the network environment 100 with respect to the first access point 105-1. The access control resource 140 applies the attributes of the probe request (such as angle of receipt) to a matrix of location information indicating locations of the access points to identify a precise location of the mobile communication device in the network.

In addition to or as an alternative to transmitting metrics associated with receipt of the discovery request 125 by a respective access point, embodiments herein can include transmitting additional metrics such as load information. The load information can indicate a number of clients (other mobile communication devices) that the respective access point 105-1 currently provides access to network 190-2. For example, assume that the access point 105-1 currently provides wireless access to thirteen mobile communication devices located in the network environment 100. In such an instance, via communications 112-1 from access point 105-1 access control resource 140, the access point 105-1 notifies the access control resource 140 that the access point 105-1 currently supports a load of thirteen mobile communication devices.

In accordance with yet further embodiments, a respective access point can transmit additional load information such as an amount data traffic and/or corresponding packet error information the respective access point 105-1 transmits to or receives from its corresponding thirteen serviced mobile communication devices. For example, assume that the access point 105-1 currently supports approximately 80 MB (megabytes) of data traffic to the thirteen mobile communication devices serviced by the access point 105-1. In such an instance, via communications 112-1 from access point 105-1 access control resource 140, the access point 105-1 notifies the access control resource 140 that the access point 105-1 and corresponding wireless spectrum usage currently supports data traffic of 80 MB to respective clients. Via such information, the access control resource 140 is able to determine a degree to which the respective access point 105-1 is able to provide wireless access to one or more additional mobile communication devices.

In a similar manner as discussed above with respect access point 105-1, each of the access points can generate and forward similar types of information to access control resource 140. Accordingly, the access control resource 140 has knowledge of the ability of the other access points to receive communications from the mobile communication device 120-1.

The access control resource 140 stores received metrics 170 in repository 180. As previously discussed, the metrics 170 can include one or more parameters selected from the group consisting of: a received signal strength indicator indicating a signal strength of the access point receiving the probe request, a signal-to-noise ratio associated with receiving the probe request, number of clients currently served by the access point, an amount of data traffic load associated with the access point, angle of arrival of a wireless signal conveying the probe request to the access point, etc.

In accordance with further embodiments, the access control resource 140 processes the metrics 170 to produce rank information 175. The rank information 175 indicates which of the access points receiving the discovery request 125 will be authorized to respond to the discovery request 125 with a corresponding discovery response.

More specifically, to reduce use of a portion of an available wireless spectrum to convey probe responses (discovery responses), in this example, the access control resource 140 selects fewer than all four access points (access points 105-1, access point 105-2, access point 105-3, and access point 105-4) that received the discovery request 125 to respond to the discovery request 125. As an example, the access control resource 140 may select best-suited access points (such as fewer-than-all access points that receive the discovery request) to respond to the discovery request 125.

In contrast to conventional techniques in which each of the access points receiving the discovery request 125 responds with a discovery response (via a respective wireless communication signal), a technique of selecting the fewer-than-all access points to respond reduces a number of access points in the network environment 100 that respond to receipt of the discovery request 125 with generation of a discovery response to the mobile communication device 120-1. In other words, instead of all four access points including access point 105-1, access point 105-2, access point 105-3, and access point 105-4, each responding with a discovery response, the access control resource 140 selects less than all of these access points to respond.

As further discussed herein, any suitable method can be used to determine the best-suited access points to respond to the discovery request 125 based on metrics 170 and/or other information associated with network environment 100 such as location of each of the access points 105 with respect to each other.

Figure 2:
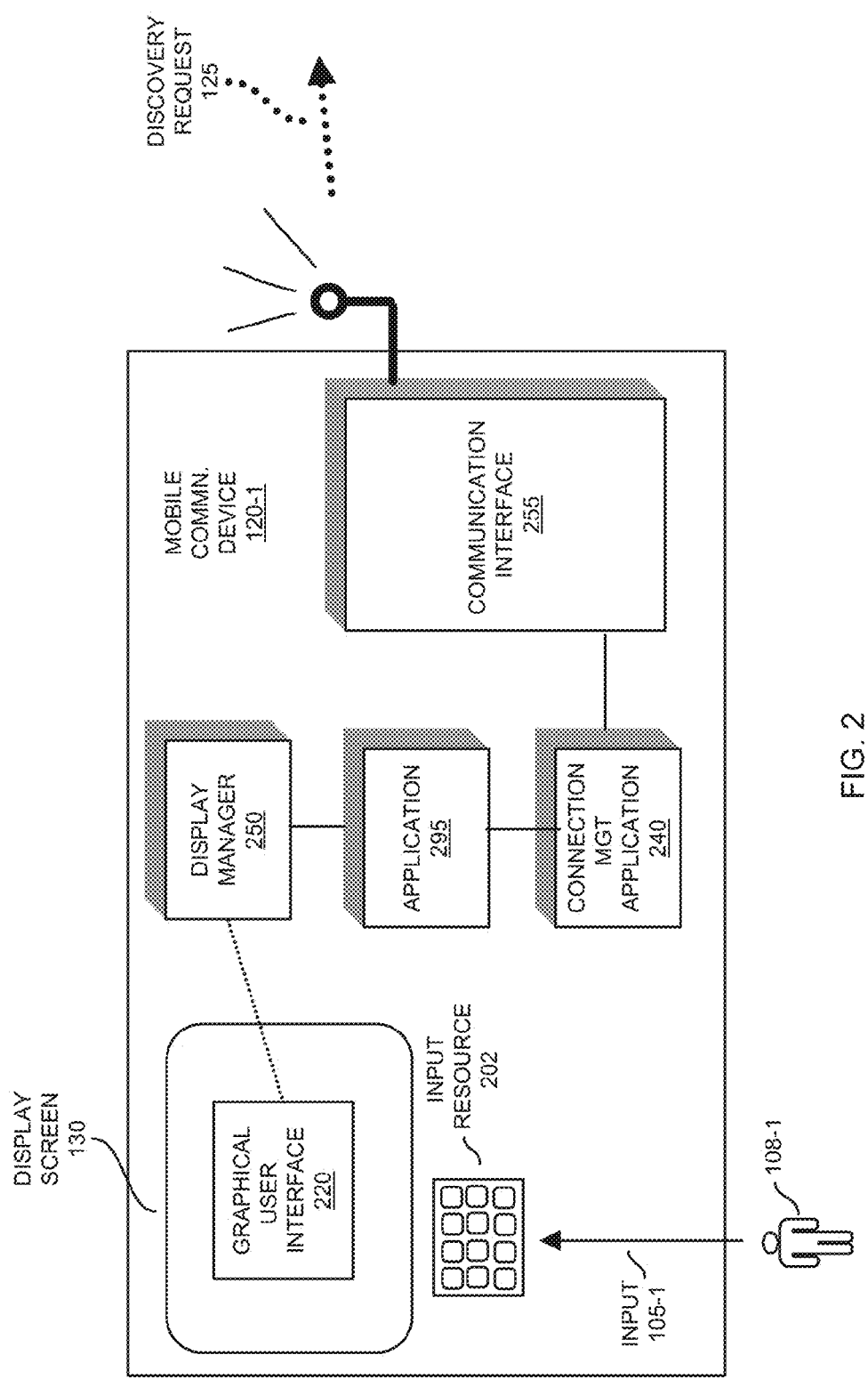
FIG. 2 is an example diagram illustrating a mobile computer device and a corresponding connection management application according to embodiments herein.

FIG. 2 is an example block diagram illustrating functionality associated with a respective mobile communication device according to embodiments herein. Note that mobile communication device 120-1 can include any suitable hardware and software resources to carry out operations as discussed herein.

More specifically, as shown in this example embodiment, mobile communication device 120-1 includes display screen 130, connection management application 240, display manager 250, application 295 (such as a browser application), communication interface 255, etc. Each mobile communication device in network environment 100 can operate in a similar manner and include similar resources, interfaces, applications, etc., as mobile communication device 120-1.

Via input 105-1 to input resource 202 (such as a keyboard, touchscreen, mouse, etc.), assume that the user 108-1 initiates execution of application 295 such as a browser application. In one embodiment, subsequent to execution, the application 295 communicates with connection management application 240 to establish a respective wireless connection with a corresponding access point in network environment 100.

In response to receiving a command from application 295 to establish a network connection, the connection management application 240 (via communication interface 255) attempts to establish a respective wireless communication link with a wireless access point associated in network environment 100. As previously discussed, this can include generating and transmitting a corresponding discovery request 125 (such as from communication interface 255) to any listening access points 105 in network environment 100. The connection management application 240 selects amongst the responding one or more access points to establish a corresponding wireless communication link.

Subsequent to establishing a respective wireless communication link, the application 295 is able to communicate through a respective access point and access network 190-2.

As shown, via display manager 250 in mobile communication device 120-1, the application 295 initiates display of corresponding graphical user interface 220 on display screen 130 of mobile communication device 120-1. Graphical user interface 220 on display screen 130 enables the respective user 108-1 to view information retrieved from server resources in network 190-2.

Figure 3:
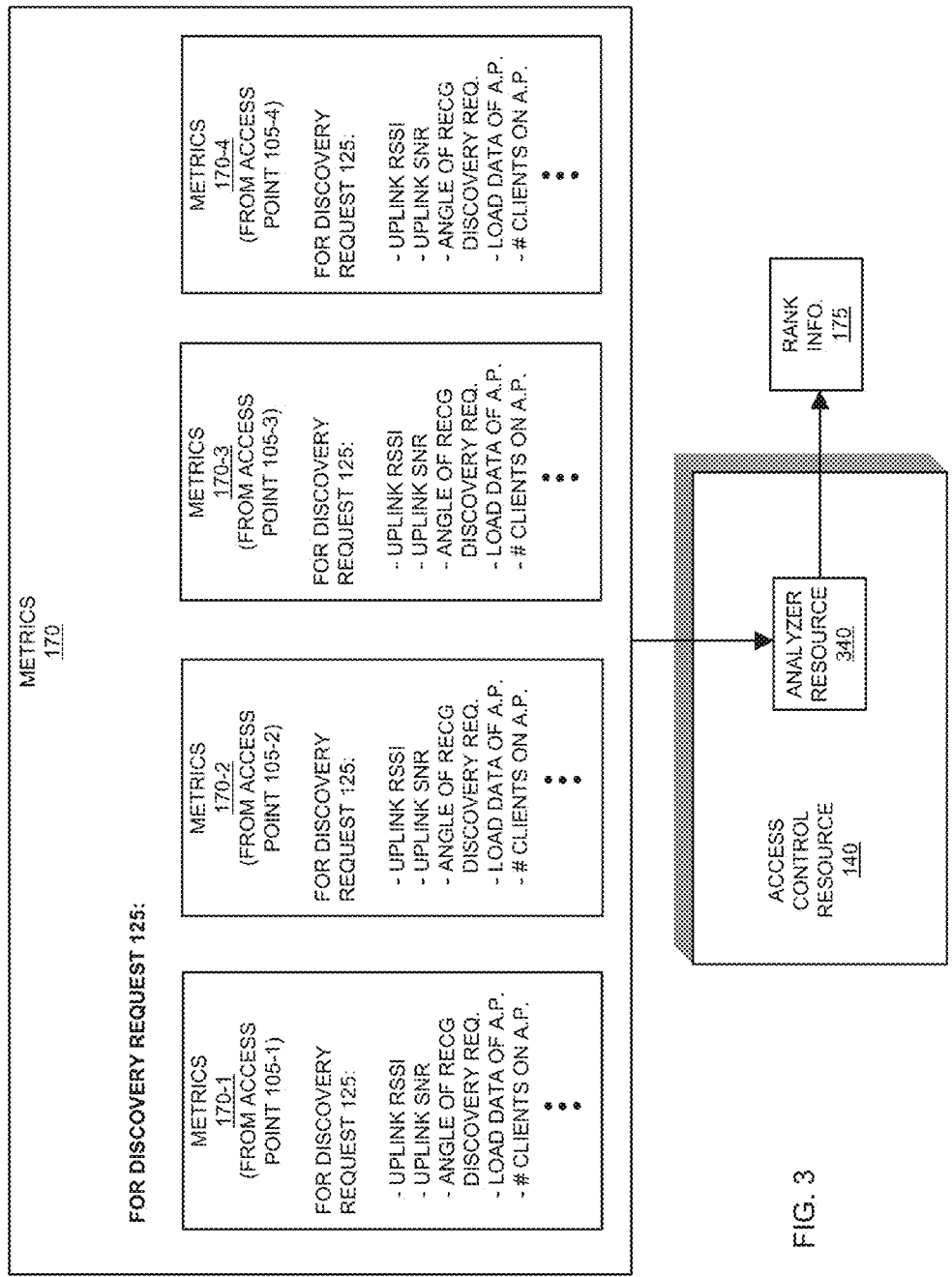
FIG. 3 is an example diagram illustrating use of metrics (as collected from multiple access points) to generate corresponding rank information according to embodiments herein.

FIG. 3 is an example diagram illustrating use of metrics (as collected from multiple access points) to generate corresponding rank information according to embodiments herein.

As previously discussed, each of the access points that receives the discovery request 125 forwards corresponding metrics to access control resource 140. Access control resource 140 stores the received metrics in a respective repository 180.

Assume in this example embodiment, that the access control resource 140 receives metrics 170-1 from access point 105-1 in response to the access point 105-1 receiving the discovery request 125. As shown, metrics 170-1 received from access point 105-1 can include any suitable information such as a received signal strength indicator indicating a signal strength of the respective access point 105-1 receiving the discovery request 125, a signal-to-noise ratio associated with receiving the discovery request 125 (which represents the signal) by the respective access point 105-1, a number of clients currently served by the respective access point 105-1, a data traffic load associated with the respective access point 105-1 transmitting or receiving data over the respective wireless links to corresponding communication devices, and an angle of arrival of a wireless signal conveying the discovery request 125 to the respective access point 105-1, etc.

In a similar manner, the access control resource 140 receives metrics 170-2 from access point 105-2 in response to the access point 105-2 receiving the discovery request 125. As shown, metrics 170-2 received from access point 105-2 can include any suitable information such as a received signal strength indicator indicating a signal strength of the respective access point 105-2 receiving the discovery request 125, a signal-to-noise ratio associated with receiving the discovery request 125 (which represents the signal) by the respective access point 105-2, a number of clients currently served by the respective access point 105-2, a data traffic load associated with the respective access point 105-2 transmitting or receiving data over the respective wireless links to corresponding communication devices, and an angle of arrival of a wireless signal conveying the discovery request 125 to the respective access point 105-2, etc.

In a similar manner, the access control resource 140 receives metrics 170-3 from access point 105-3 in response to the access point 105-3 receiving the discovery request 125. As shown, metrics 170-3 received from access point 105-3 can include any suitable information such as a received signal strength indicator indicating a signal strength of the respective access point 105-3 receiving the discovery request 125, a signal-to-noise ratio associated with receiving the discovery request 125 (which represents the signal) by the respective access point 105-3, a number of clients currently served by the respective access point 105-3, a data traffic load associated with the respective access point 105-3 transmitting or receiving data over the respective wireless links to corresponding communication devices, and an angle of arrival of a wireless signal conveying the discovery request 125 to the respective access point 105-3, etc.

In a similar manner, the access control resource 140 receives metrics 170-4 from access point 105-4 in response to the access point 105-4 receiving the discovery request 125. As shown, metrics 170-4 received from access point 105-4 can include any suitable information such as a received signal strength indicator indicating a signal strength of the respective access point 105-4 receiving the discovery request 125, a signal-to-noise ratio associated with receiving the discovery request 125 (which represents the signal) by the respective access point 105-4, a number of clients currently served by the respective access point 105-4, a data traffic load associated with the respective access point 105-4 transmitting or receiving data over the respective wireless links to corresponding communication devices, and an angle of arrival of a wireless signal conveying the discovery request 125 to the respective access point 105-4, etc.

In one embodiment, the analyzer resource 340 compares metrics 170-1, metrics 170-2, metrics 170-3, and metrics 170-4 to rank the corresponding access points 105 for providing the mobile communication device 120-1 access to network 190-2. For example, the analyzer resource 340 receives and processes metrics 170-1, metrics 170-2, metrics 170-3, and metrics 170-4. Based on a comparison of the metrics 170, the analyzer resource 340 produces rank information 175 indicating which of the access point are best-suited and least-suited to provide wireless access services to the mobile communication device 120-1.

In one embodiment, the determination of ranking is based on settings for a number of attributes in metrics 170.

For example, metrics 170-1 may indicate that the discovery request 125 received by the access point 105-1 had a high signal strength and high signal-to-noise ratio compared to other access points receiving the discovery request 125. The metrics 170-1 may also indicate that the access point 105-1 provides access to a low number of mobile communication devices compared to the other access points 105-2, access point 105-3, and access point 105-4. In such an instance, the access point 105-1 receives a high-ranking as a candidate in which to provide mobile communication device 120-1 access to network 190-2. In a similar manner, assume that the analyzer resource 340 analyzes metrics 170-3 and determines (based on a respective comparison) that access point 105-3 is also a reasonably good candidate to provide mobile communication device 120-1 access to network 190-2. In such an instance, the analyzer resource 340 ranks access point 105-1 and access point 105-3 as better-suited candidates.

Metrics 170-4 may indicate that the discovery request 125 received by the access point 105-4 had a low signal strength and low signal-to-noise ratio compared to other access points receiving the discovery request 125. The metrics 170-4 may also indicate that the access point 105-4 provides access to a high number of mobile communication devices compared to the other access points 105-1, access point 105-2, and access point 105-3. In such an instance, the access point 105-4 receives a low ranking as a candidate in which to provide mobile communication device 120-1 access to network 190-2. In a similar manner, the analyzer resource 340 analyzes metrics 170-2 and determines that access point 105-2 is also not a good candidate to provide mobile communication device 120-1 access to network 190-2. In such an instance, the analyzer resource 340 ranks access point 105-2 and access point 105-4 as lesser suited candidates to provide communication device 120-1 access to network 190-2.

In accordance with yet further embodiments, the analyzer resource 340 can be configured to use corresponding metrics 170 to identify a nearness in proximity of each access point in the group (of access points that receives the discovery request 125) to the mobile communication device 120-1. Nearness in proximity may be one factor in determining a degree to which a corresponding access point is suitable to provide network access.

For example, the analyzer resource 340 utilizes metrics 170 to determine an approximate location of the mobile communication device 120-1 in the network environment 100 with respect to the receiving access points 105. As previously discussed, information such as the received signal strength, signal-to-noise ratio, the angle of message receipt, etc., associated with receipt of the discovery request 125 provide clues as to a corresponding location of the mobile communication device 120-1 in network environment 100. The analyzer resource 340 utilizes the corresponding metrics 170 in conjunction with static information such as known installation locations of the access points to detect which of access points is best-suited to provide access to the mobile communication device 120-1.

In certain instances, assuming that an access point nearest the mobile communication device 120-1 is not overloaded with servicing other mobile communication devices, the access point nearest the mobile communication device 120-1 is chosen as the best candidate for the mobile communication device 120-1 to establish a respective wireless connection.

Based on the analysis as discussed above, the analyzer resource 340 selects the fewer-than-all access points (such as one or more access points) that are to respond to the discovery request 125 based on the nearness in proximity.

Figure 4:
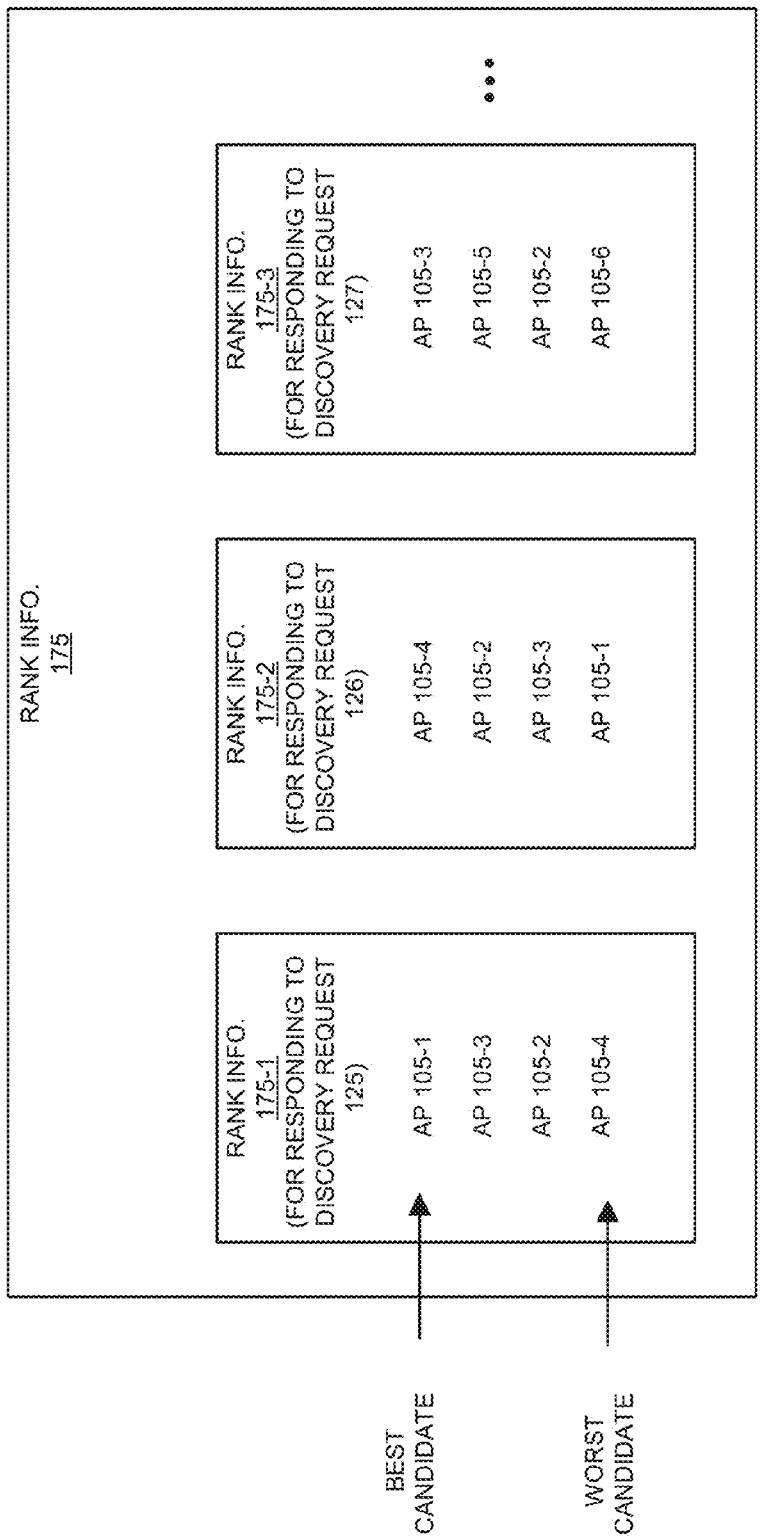
FIG. 4 is an example diagram illustrating rank information indicating which of multiple access points that receives a respective discovery request is to respond to the discovery request with a respective discovery response according to embodiments herein.

FIG. 4 is an example diagram illustrating rank information indicating which of multiple access points that receives a respective discovery request is to respond to the discovery request with a respective discovery response according to embodiments herein.

In this example embodiment, as previously discussed, the group of candidate access points including access point 105-1, access point 105-2, access point 105-3, and access point 105-4 each receive the discovery request 125. As previously discussed, based on analysis and comparison of metrics 170-1, metrics 170-2, metrics 170-3, and metrics 170-4, the analyzer resource 340 of access control resource 140 produces rank information 175-1.

In this example embodiment, rank information 175-1 indicates that: access point 105-1 is the best candidate for mobile communication device 120-1 to establish a respective wireless connection; access point 105-3 is a next best candidate for mobile communication device 120-1 to establish a respective wireless connection; access point 105-2 is a next best candidate for mobile communication device 120-1 to establish a respective wireless connection; access point 105-4 is a next best candidate (worse candidate in the group) for mobile communication device 120-1 to establish a respective wireless connection.

As previously discussed, the access control resource 140 chooses one or more of the best candidates to respond to the discovery request 125. Assume in this example that the access control resource 140 selects the best two candidate access points access point 105-1 and access point 105-3 to respond.

Note that the number of selected candidate access points can vary depending upon network conditions. For example, during conditions in which the network environment is lightly used, the access control resource 140 can select a greater number of access points to respond to the discovery request 125. Alternatively, during congested conditions in which the network is heavily used, the access control resource 140 can select a smaller number of access points to respond to the discovery request 125.

As shown, the analyzer resource 340 can be configured to generate ranking information for each of different instances of a respective mobile communication device receiving a discovery request. For example, analyzer resource 340 produces rank information 175-2 based on detection of discovery request 126 (by access point 105-1, 105-2, 105-3, and 105-4) in network environment 100; analyzer resource 340 produces rank information 175-3 based on detection of discovery request 127 (by access point 105-1, 105-2, 105-3, and 105-4) in network environment 100; and so on.

Figure 5:
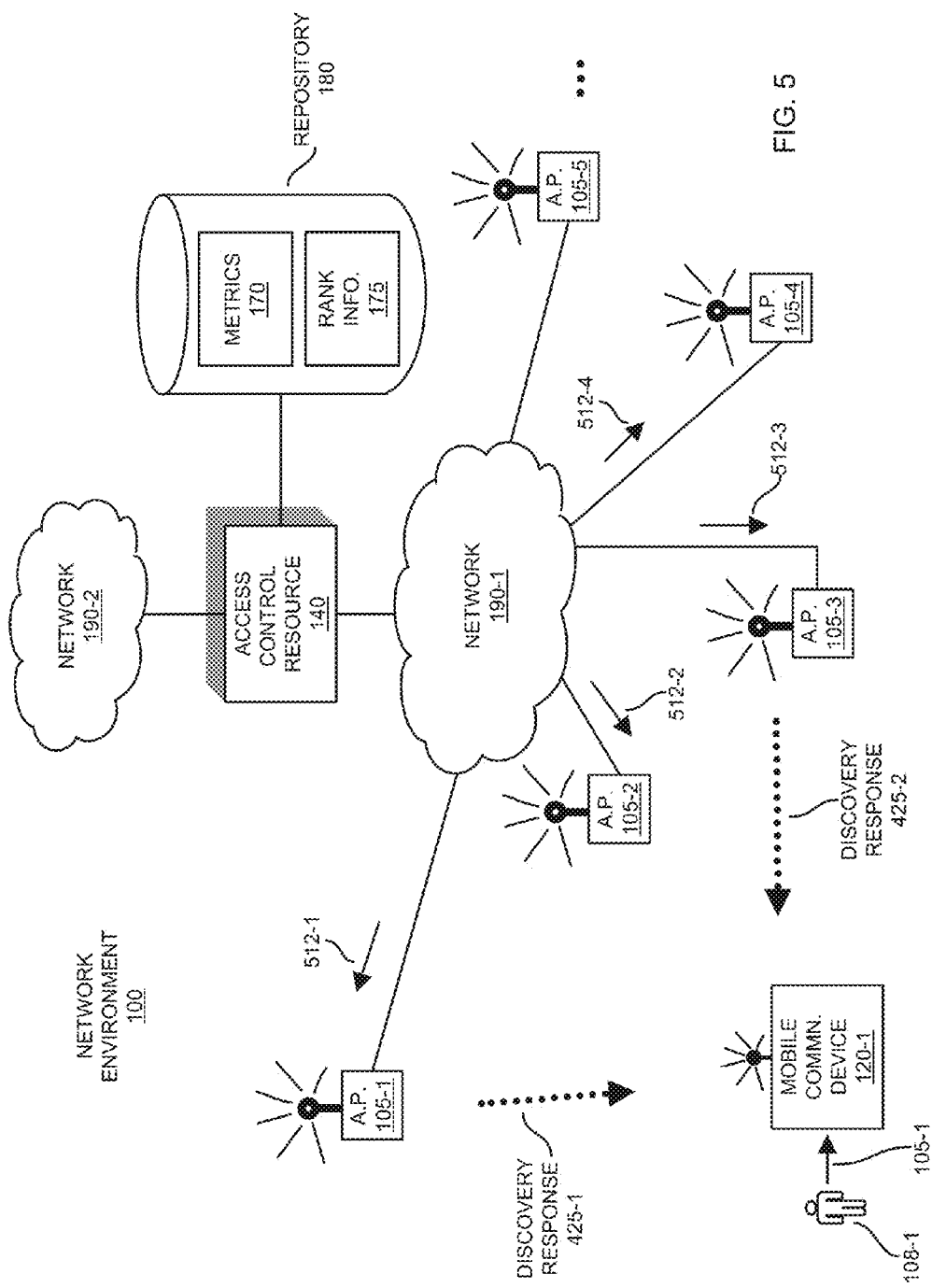
FIG. 5 is an example diagram illustrating transmission of communications to one or more access points to respond to a respective discovery request with a discovery response according to embodiments herein.

FIG. 5 is an example diagram illustrating transmission of control communications to one or more access points to respond to a respective discovery request with a discovery response according to embodiments herein.

Subsequent to selecting which of the access points is authorized to respond to the discovery request 125, access control resource 140 forwards corresponding feedback to the fewer-than-all access points (such as access point 105-1 and access point 105-3) in the group. In one embodiment, the feedback notifies the selected (i.e., fewer-than-all) access points (access points 105-1 and 105-3) in the original group (access points 105-1, 105-2, 105-3, and 105-4) to respond to the discovery request 125 with a discovery response. Via the feedback (such as communications 512) from the access control resource 140, each of the fewer-than-all access points (such as access points 105-1 access point 105-3) in the original group receives the authorization to respond to the discovery request 125.

In this example embodiment, via communications 512-1 from the access control resource 140 to the access point 105-1, the access control resource 140 notifies the access point 105-1 to respond to the discovery request 125. In response to receiving the communication 512-1 from the access control resource 140, the access point 105-1 generates and transmits a respective discovery response 425-1 (such as a wireless communication signal) in the network environment 100. The discovery response 425-1 notifies the mobile communication device of the presence of the access point 105-1 in the network. Note that the discovery response 425-1 (notification) can include a specific unique identifier value assigned to the corresponding access point 105-1. Accordingly, the mobile communication device 120-1 receiving the discovery response 425-1 is able to identify that access point 105-1 generated the discovery response 425-1 and is available for use.

Via communications 512-3 from the access control resource 140 to the access point 105-3, the access control resource 140 notifies the access point 105-3 to respond to the discovery request 125. In response to receiving the communication 512-3 from the access control resource 140, the access point 105-3 generates and transmits a respective discovery response 425-2 (such as a wireless communication signal) in the network environment 100. The discovery response 425-2 notifies the mobile communication device of the presence of the access point 105-3 in the network. Note that the discovery response 425-2 (notification) can include a specific unique identifier value assigned to the corresponding access point 105-3. Accordingly, the mobile communication device 120-1 receiving the discovery response 425-2 is able to identify that access point 105-3 generated the discovery response 425-2 and is available for use.

In the above example, note that access points 105-2 and 105-4 in the group of access points that receive the discovery request 125 are not chosen to respond to the discovery request 125. In one embodiment, the access control resource 140 notifies (via appropriate messages) each of the least suited access points such as access points 105-2 and 105-4 in the group not to respond to the discovery request 125 with a corresponding discovery response. For example, via communications 512-2 from the access control resource 140 to the access point 105-2, the access control resource 140 notifies the access point 105-2 not to respond to the discovery request 125. In response to receiving the communication 512-2 indicating not to respond, the access point 105-2 refrains from generating and transmitting a respective discovery response to the mobile communication device 120-1.

In a similar manner, via communications 512-4 from the access control resource 140 to the access point 105-4, the access control resource 140 notifies the access point 105-4 not to respond to the discovery request 125. In response to receiving the communication 512-4 indicating not to respond, the access point 105-4 refrains from generating a discovery response to the mobile communication device 120-1.

Thus, embodiments herein can include selectively preventing transmission of one or more discovery responses to the mobile communication device 120-1.

Embodiments herein are useful over conventional techniques. For example, reducing the number of wireless communication probe responses (discovery responses) transmitted in network environment 100 frees up the available wireless spectrum in network environment 100 for transmission of data.

Figure 6:
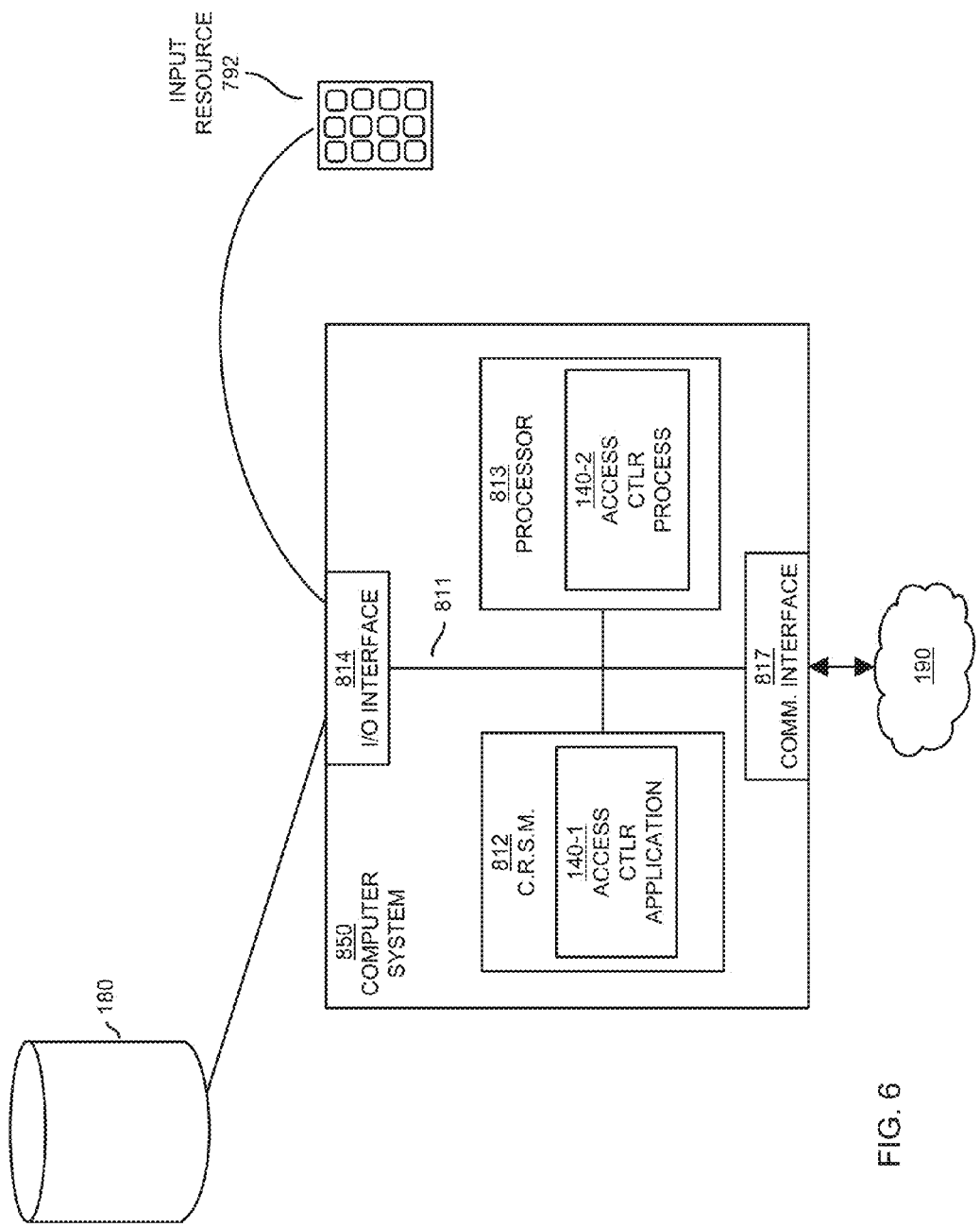
FIG. 6 is a diagram illustrating an example computer architecture in which to execute any of the functionality according to embodiments herein.

FIG. 6 is an example block diagram of a computer device for implementing any of the operations as discussed herein according to embodiments herein.

As shown, computer system 850 of the present example includes an interconnect 811, a processor 813 (such as one or more processor devices, computer processor hardware, etc.), computer readable storage medium 812 (such as hardware storage to store data), I/O interface 814, and communications interface 817. Computer system 850 can execute the operations associated with access control resource 140, mobile communication device 120-1, etc.

Interconnect 811 provides connectivity amongst processor 813 (computer processor hardware), computer readable storage media 812, I/O interface 814, and communication interface 817.

I/O interface 814 provides connectivity to a repository 180 and, if present, other devices such as a playback device, display screen, input resource 792, a computer mouse, etc.

Computer readable storage medium 812 (such as a non-transitory hardware medium) can be any hardware storage resource or device such as memory, optical storage, hard drive, rotating disk, etc. In one embodiment, the computer readable storage medium 812 stores instructions executed by processor 813.

Communications interface 817 enables the computer system 850 and processor 813 to communicate over a resource such as network 190 to retrieve information from remote sources and communicate with other computers. I/O interface 814 enables processor 813 to retrieve stored information from repository 180.

As shown, computer readable storage media 812 is encoded with access control application 140-1 (e.g., software, firmware, etc.) executed by processor 813. Access control application 140-1 can be configured to include instructions to implement any of the operations as discussed herein.

During operation of one embodiment, processor 813 (e.g., computer processor hardware) accesses computer readable storage media 812 via the use of interconnect 811 in order to launch, run, execute, interpret or otherwise perform the instructions in access control application 140-1 stored on computer readable storage medium 812.

Execution of the access control application 140-1 produces processing functionality such as access control process 140-2 in processor 813. In other words, the access control process 140-2 associated with processor 813 represents one or more aspects of executing access control application 140-1 within or upon the processor 813 in the computer system 850.

Those skilled in the art will understand that the computer system 850 can include other processes and/or software and hardware components, such as an operating system that controls allocation and use of hardware resources to execute domain management application 140-1.

In accordance with different embodiments, note that computer system may be any of various types of devices, including, but not limited to, a wireless access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 850 may reside at any location or can be included in any suitable resource in network environment 100 to implement functionality as discussed herein.

Functionality supported by the different resources will now be discussed via flowcharts in FIGS. 7 and 8. Note that the steps in the flowcharts below can be executed in any suitable order.

Figure 7:
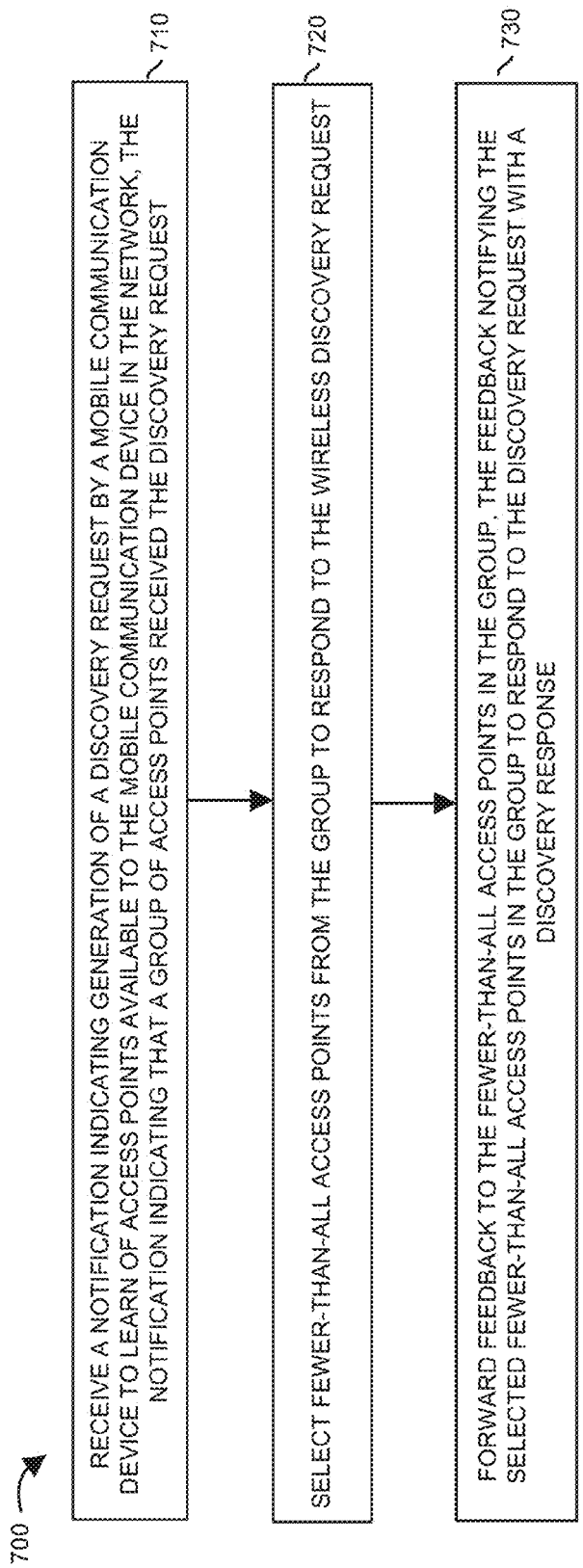
FIGS. 7 and 8 are example diagrams illustrating methods according to embodiments herein.

FIG. 7 is a flowchart 700 illustrating an example method according to embodiments. Note that there will be some overlap with respect to concepts as discussed above.

In processing block 710, the access control resource 140 receives notification indicating generation of a discovery request 125 by the mobile communication device 120-1 to learn of access points available to the mobile communication device 120-1 in the network. The received notification indicates that a group of access points received the discovery request 125.

In processing block 720, the access control resource 140 selects fewer-than-all access points from the group to respond to the wireless discovery 125 request.

In processing block 730, the access control resource 140 forwards feedback (such as communications 512) to the fewer-than-all access points in the group. The feedback notifies the selected fewer-than-all access points in the group to respond to the discovery request 125 with a respective discovery response 425.

Figure 8:
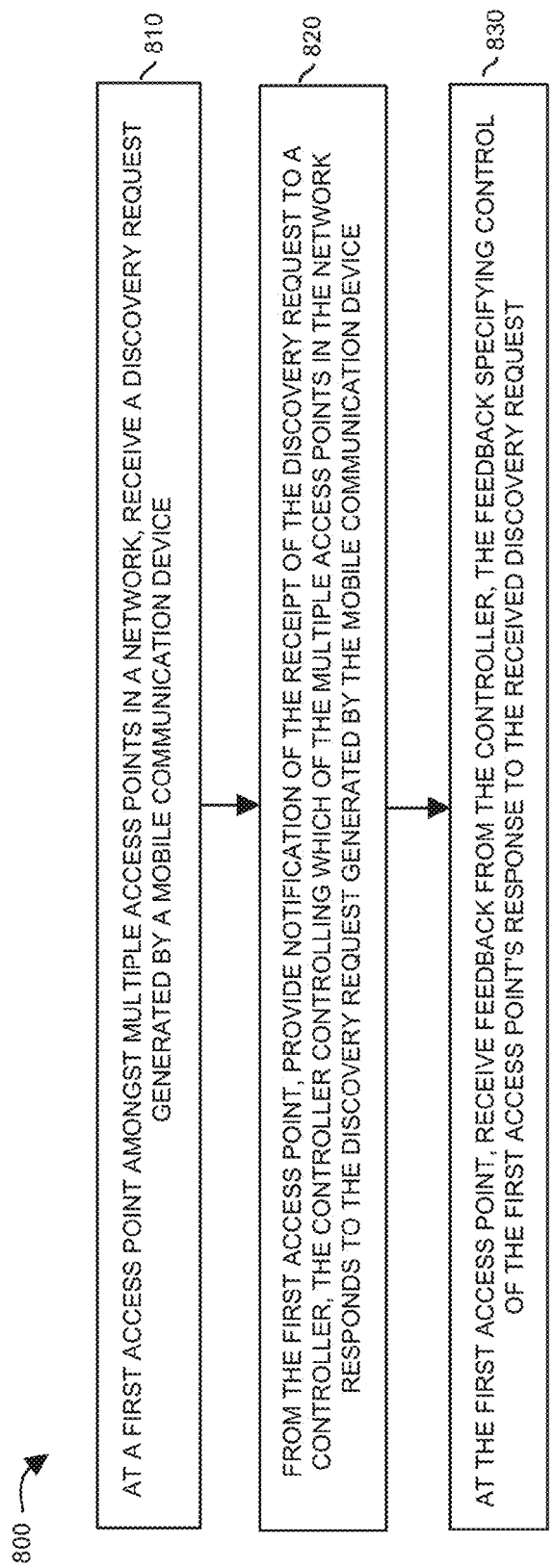

FIG. 8 is a flowchart 800 illustrating an example method according to embodiments. Note that there will be some overlap with respect to concepts as discussed above.

In processing block 810, a first access point 105-1 (amongst multiple access points in a network) receives a discovery request 125 generated by a mobile communication device 120-1.

In processing block 820, the first access point 105-1 provides notification (such as via communications 112-1) of the receipt of the discovery request 125 to access control resource 140. The access control resource 140 controls which of the multiple access points 105 in the network responds to the discovery request 125 generated by the mobile communication device 120-1.

In processing block 830, the first access point 105-1 receives feedback (such as communications 512-1) from the access control resource 140. The feedback specifies control of the first access point's response to the received discovery request 125.

Note again that techniques herein are well suited for use in controlling wireless responses generated by respective access points in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   at a controller that controls multiple access points in a network:
   receiving notification indicating generation of a discovery request by a mobile communication device to learn of access points available to the mobile communication device in the network, the notification indicating that a group of access points received the discovery request;
   selecting a set of fewer-than-all access points from the group to respond to the discovery request, a number of how many access points included in the set being based on current usage of the access points in the network; and
   forwarding feedback to the fewer-than-all access points in the group, the feedback notifying the selected fewer-than-all access points in the set to respond to the discovery request with a discovery response; and
   wherein a magnitude of the number of access points selected for inclusion in the set depends on the usage information indicating an amount of usage by other mobile communication devices wirelessly communicating with the access points to access a remote network.

2. The method as in claim 1, wherein the discovery request generated by the mobile communication device is a wireless signal transmitted in a vicinity of the group of access points; and
   wherein receiving the notification includes: receiving a respective communication from each corresponding access point in the group, the respective communication indicating receipt of the discovery request by the corresponding access point.

3. The method as in claim 1, wherein selecting the set of fewer-than-all access points from the group includes:
   ranking the access points in the group, the ranking indicating which access points in the group are best suited and least suited to provide the mobile communication device wireless access to the network; and producing the fewer-than-all access points to include the best suited access points in the ranking;
   wherein forwarding the feedback to the fewer-than-all access points in the group includes: notifying each of the best suited access points in the group to respond to the discovery request with a discovery response; and notifying each of the least suited access points in the group not to respond to the discovery request with a discovery response.

4. The method as in claim 1, wherein the group of access points includes a first access point and a second access point; and
   wherein receiving the notification of the discovery request includes:
   receiving a first communication, the first communication received from the first access point in the network, the first communication indicating that the first access point received the discovery request generated by the mobile communication device; and
   receiving a second communication, the second communication received from the second access point in the network, the second communication indicating that the second access point received the discovery request generated by the mobile communication device.

5. The method as in claim 4, wherein selecting the set of fewer-than-all access points from the group to respond to the discovery request includes: i) selecting the first access point to respond with a discovery response to the discovery request generated by the mobile communication device, the discovery response generated by the first access point indicating to the mobile communication device of the availability of the first access point to access the network, and ii) foregoing inclusion of the second access point in the set of fewer than all access points; and
   wherein forwarding the feedback to the fewer-than-all access points in the group includes: i) notifying the first access point to respond to discovery request received from the mobile communication device with a discovery response, and ii) notifying the second access point not to respond to the discovery request received from the mobile communication device.

6. The method as in claim 5 further comprising:
   receiving first metric information indicating attributes of the discovery request received by the first access point;
   receiving second metric information indicating attributes of the discovery request received by the second access point; and
   based on comparing the first metric information to the second metric information, selecting the first access point for inclusion in the fewer-than-all access points, and foregoing inclusion of the second access point in the fewer-than-all access points.

7. The method as in claim 6, wherein each of the first metric information and second metric information includes one or more parameters selected from the group consisting of:
a received signal strength indicator indicating a signal strength of a respective access point receiving the discovery request,
a signal-to-noise ratio associated with receiving the discovery request by a respective access point,
number of clients currently served by the respective access point,
a traffic load associated with the respective access point, and
an angle of arrival of a wireless signal conveying the discovery request to the respective access point.

8. The method as in claim 1, wherein selecting the fewer-than-all access points from the group includes:
identifying a nearness in proximity of each access point in the group to the mobile communication device; and
selecting access points to be included in the fewer-than-all access points based on the nearness in proximity.

9. The method as in claim 8 further comprising:
in response to detecting that the mobile communication device is closest in proximity to a given access point of the access points, including the given access point in the set of fewer-than-all access points.

10. The method as in claim 1 further comprising:
from the first access point, transmitting metrics to the controller, the metrics indicating attributes of the discovery request received by the first access point; and
wherein the controller uses the metrics received from the first access point to produce the feedback.

11. The method as in claim 10, wherein the attributes of the discovery request indicate a relative location of the mobile communication device in the network with respect to the first access point.

12. The method as in claim 11, wherein the controller applies the attributes of the discovery request to a matrix of location information indicating locations of the access points to identify a precise location of the mobile communication device in the network.

13. The method as in claim 1 further comprising:
tracking locations of the access points in the network environment;
receiving a communication from a first access point of the access points, the communication indicating an angle with respect to the first access point from which the discovery request is received by the first access point from the mobile communication device; and
utilizing the angle as a basis in which to identify a location of the mobile communication device with respect to the access points in the network environment.

14. The method as in claim 13 further comprising:
determining the locations of the access points based on communications amongst the different access points indicating relative locations of the access points with respect to each other.

15. The method as in claim 14, wherein forwarding the feedback to the set of fewer-than-all access points in the group includes notifying each best suited access point in the group to respond to the discovery request with a discovery response, the method further comprising:
notifying each least suited access point in the group not to respond to the discovery request with a discovery response.

16. The method as in claim 1 further comprising:
receiving the usage information from the access points, the usage information including load information, the load information indicating wireless spectrum usage and corresponding amounts of conveyed wireless data supported by each of the access points.

17. A method comprising:
at a first access point amongst multiple access points in a network, receiving a discovery request generated by a mobile communication device;
from the first access point, providing notification of the receipt of the discovery request to a controller, the controller controlling which of the multiple access points in the network responds to the discovery request generated by the mobile communication device;
at the first access point, receiving feedback from the controller, the feedback specifying control of the first access point's response to the received discovery request, the controller generating the feedback based on current wireless spectrum usage in the network, the controller learning of the current wireless spectrum usage based on input from the multiple access points; and
wherein the controller selects a number of the multiple access points including the first access point to respond to the discovery request generated by the mobile communication device, a magnitude of the number depending on usage information indicating an amount of usage by other mobile communication devices wirelessly communicating with the multiple access points to access a remote network.

18. The method as in claim 17, wherein the feedback notifies the first access point to respond to the discovery request, the method further comprising:
from the first access point, in response to receiving the feedback from the controller indicating to respond to the discovery request, transmitting a discovery response to the mobile communication device.

19. A computer system comprising:
computer processor hardware; and
a hardware storage resource coupled to the computer processor hardware, the hardware storage resource storing instructions that, when executed by the computer processor hardware, causes the computer processor hardware to perform operations of:
receiving notification indicating generation of a discovery request by a mobile communication device to learn of access points available to the mobile communication device in a network, the notification indicating that a group of access points received the discovery request;
selecting a set of fewer-than-all access points from the group to respond to the discovery request, the fewer-than-all access points selected based on current usage of the network as detected by the access points;
forwarding feedback to the fewer-than-all access points in the group, the feedback notifying the selected fewer-than-all access points in the group to respond to the discovery request with a discovery response;
wherein a magnitude of the number of the access points selected for inclusion in the set depends on the usage information indicating an amount of usage by other mobile communication devices wirelessly communicating with the access points to access a remote network.

20. The computer system as in claim 19, wherein the discovery request generated by the mobile communication device is a wireless signal transmitted in a vicinity of the group of access points; and wherein receiving the notification includes: receiving a respective communication from each access point in the group, the respective communication indicating receipt of the discovery request by the access point.

21. The computer system as in claim 19, wherein selecting the fewer-than-all access points from the group includes: ranking the access points in the group, the ranking indicating which access points in the group are best suited and least suited to provide the mobile communication device wireless access to the network; and producing the fewer-than-all access points to include the best suited access points in the ranking;

wherein forwarding the feedback to the fewer-than-all access points in the group includes notifying each of the best suited access points in the group to respond to the discovery request with a discovery response, the computer processor hardware further performs operations of:

notifying each of the least suited access points in the group not to respond to the discovery request with a discovery response.

22. The computer system as in claim 19, wherein the group of access points includes a first access point and a second access point; and wherein receiving the notification of the discovery request includes:

receiving a first communication, the first communication received from the first access point in the network, the first communication indicating that the first access point received the discovery request generated by the mobile communication device; and receiving a second communication, the second communication received from the second access point in the network, the second communication indicating that the second access point received the discovery request generated by the mobile communication device.

23. The computer system as in claim 22, wherein selecting fewer-than-all access points from the group to respond to the discovery request includes: i) selecting the first access point to respond with a discovery response to the discovery request generated by the mobile communication device, the discovery response generated by the first access point indicating to the mobile communication device of the availability of first access point to access the network, and ii) foregoing inclusion of the second access point in the fewer than all access points; and wherein forwarding the feedback to the fewer-than-all access points in the group includes: i) notifying the first access point to respond to discovery request received from the mobile communication device with a discovery response, and ii) notifying the second access point not to respond to the discovery request received from the mobile communication device.

24. The computer system as in claim 23, wherein the computer processor hardware further performs operations of:

receiving first metric information indicating attributes of the discovery request received by the first access point;

receiving second metric information indicating attributes of the discovery request received by the second access point; and based on comparing the first metric information to the second metric information, selecting the first access point for inclusion in the fewer-than-all access points, and foregoing inclusion of the second access point in the fewer-than-all access points.

25. The computer system as in claim 24, wherein each of the first metric information and second metric information includes one or more parameters selected from the group consisting of:

a received signal strength indicator indicating a signal strength of a respective access point receiving the discovery request, a signal-to-noise ratio associated with receiving the discovery request by a respective access point, number of clients currently served by the respective access point, a traffic load associated with the respective access point, and an angle of arrival of a wireless signal conveying the discovery request to the respective access point.

26. The computer system as in claim 19, wherein selecting the fewer-than-all access points from the group includes:

identifying a nearness in proximity of each access point in the group to the mobile communication device; and selecting access points to be included in the fewer-than-all access points based on the nearness in proximity.

27. Computer-readable hardware storage having instructions stored thereon, the instructions, when carried out by computer processor hardware, causes the computer processor hardware to perform operations of:

receiving notification indicating generation of a discovery request by a mobile communication device to learn of access points available to the mobile communication device in a network, the notification indicating that a group of access points received the discovery request;

selecting a set of fewer-than-all access points from the group to respond to the discovery request, a number of how many access points included in the set being based on current usage of the access points in the network;

forwarding feedback to the fewer-than-all access points in the group, the feedback notifying the selected fewer-than-all access points in the group to respond to the discovery request with a discovery response; and wherein a magnitude of the number of the access points selected for inclusion in the set depends on the usage information indicating an amount of usage by other mobile communication devices wirelessly communicating with the access points to access a remote network.

28. A method comprising:

at a controller that controls multiple access points in a network:

receiving notification indicating generation of a discovery request by a mobile communication device to learn of access points available to the mobile communication device in the network, the notification indicating that a group of access points received the discovery request;

selecting a set of fewer-than-all access points from the group to respond to the discovery request, a number of how many access points included in the set being based on current usage of the access points in the network;

forwarding feedback to the fewer-than-all access points in the group, the feedback notifying the selected fewer-than-all access points in the group to respond to the discovery request with a discovery response; and wherein selecting the set of fewer-than-all access points includes: in response to a condition in which the detected usage indicates that the network is not congested, selecting the number to be greater than a number of access points otherwise selected in the presence of congestion in the network.

29. A method comprising:

at a controller that controls multiple access points in a network:

receiving notification indicating generation of a discovery request by a mobile communication device to learn of access points available to the mobile communication device in the network, the notification indicating that a group of access points received the discovery request;

selecting a set of fewer-than-all access points from the group to respond to the discovery request, a number of how many access points included in the set being based on current usage of the access points in the network;

forwarding feedback to the fewer-than-all access points in the group, the feedback notifying the selected fewer-than-all access points in the group to respond to the discovery request with a discovery response; and wherein selecting the set of fewer-than-all access points includes: in response to a condition in which the detected usage indicates that the network is not congested, selecting the number to be less than a number of access points otherwise selected in the absence of congestion in the network.

30. The method as in claim 29, wherein a magnitude of the number of the access points selected for inclusion in the set depends on usage information indicating a degree of other mobile communication devices wirelessly communicating with the access points to access a remote network.

* * * * *